United States Patent Office 3,767,748
Patented Oct. 23, 1973

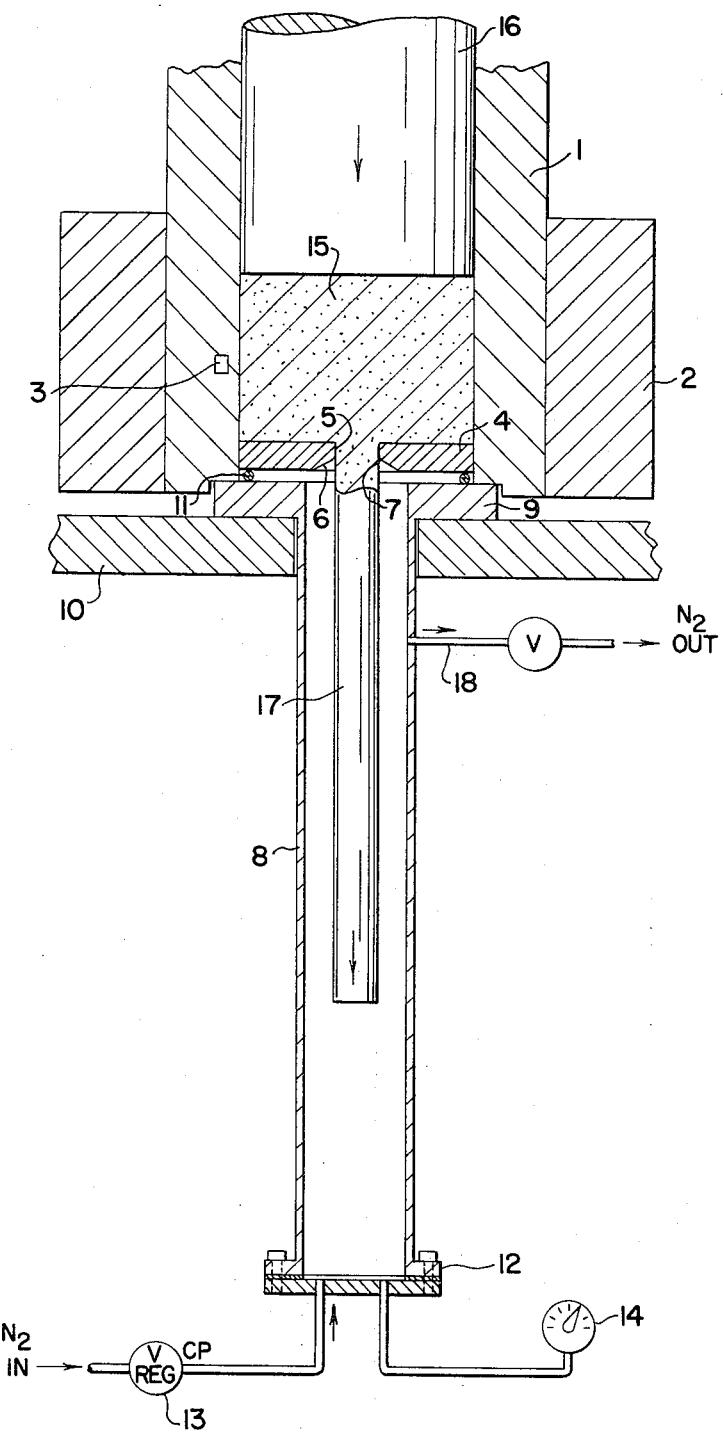

3,767,748
PROCESS OF EXTRUSION WITHOUT DISTORTION OF EXTRUDATE
King H. Rosette, Chagrin Falls, Ohio, assignor to Kewanee Oil Company, Bryn Mawr, Pa.
Filed July 28, 1971, Ser. No. 166,725
Int. Cl. B29f 3/00
U.S. Cl. 264—89
4 Claims

ABSTRACT OF THE DISCLOSURE

A downward extrusion process of a plastic material in a controlled environment within a fluid-tight chamber to permit the forming of an extrudate with a cross section substantially identical to that of the die opening. Pressure in the chamber is controlled so that the weight of the extrudate applies essentially no tension to permit a distortion-free extrudate the length of which is unrestrained except by the length of the chamber. The fluid in the fluid-tight chamber cools the extrudate so that when extrusion is discontinued, the extrudate, at its lower end, is relatively rigid. Extrudates are made discontinuously, requiring opening of the chamber or separation of the chamber from the extruder body before the extrudate is removed.

BACKGROUND OF THE INVENTION

Extrusion processes wherein a conventional extruding machine supplies a thermoplastic material to a die means provided with a vertically downwardly facing die outlet are well known in blow-molding machines where a molten parison is shaped to conform to the walls of the mold. Other extruders supply a flow of plastic material, as for example from spinnerettes, downwardly into a cooling bath in a continuous stream. The instant invention is related to conventional extruding machines which are integral with a fluid-tight chamber in which the extrudate is confined until it reaches a predetermined length while it is being cooled, and the process of extrusion is thereafter discontinued. The instant process is particularly applicable to extrudates which must be prevented from contacting any solid surface while in a deformable, semisolid, or molten state, as much for maintaining the reactable surface of the extrudate free from contamination as for subjecting it to the difficulty controllable manipulation of solid guides. The apparatus and process are particularly suited for extrudates of arbitrary cross section and predetermined length, which may be made in discontinuous sections, and where the cross section of the molten extrudate must correspond substantially identically to the outline of the die opening in the die means. In the instant invention, the extrudate flowing downwardly into the fluid-tight chamber is subjected to pressure which eliminates "necking" of the depending hot mass. The pressure to which the extrudate is subjected is such as to counteract the net tension effect of the weight of the extrudate and the surface tension effects within it, and is independent of the cross section area or the shape of the extrudate. The pressure applied is a function only of the length of the extrudate, and is controllably increased in a predeterminable relationship to the longitudinal rate of flow of extrudate until said extrudate reaches a predetermined length no greater than the length of the fluid-tight chamber.

SUMMARY OF THE INVENTION

It has been discovered that where a predetermined length of extrudate is to be formed discontinuously with an arbitrary cross section corresponding substantially identically to the cross section of the die opening through which the extrudate flows, and wherein the extrudate must be untouched by solid contact to prevent contamination of the hot surface, extrusion may be effected by permitting an increase in pressure in the fluid-tight chamber at a predeterminable rate correlatable to the longitudinal rate of flow of extrudate into said chamber, independent of the cross sectional area of the extrudate.

It has been discovered that where discontinuous lengths of distortion-free extrudate are desired, a fluid-tight chamber simultaneously provides a controlled environment of a suitably inert fluid of preselected density, which may be pressurized in a determinable gradation of increase of pressure related to the rate of flow of extrudate into the chamber, at the same time cooling the extrudate until it has reached the desired length.

It has also been discovered that conventional extruders may be easily adapted to operate in conjunction with a fluid-tight chamber, which may be an integral part of the extruder, by providing an elongated chamber of a length corresponding to the length of extrudate required, and which is amenable to being pressurized, either by the volumetric displacement within the chamber, of fluid corresponding to the extrudate itself, or by additionally supplying sufficient fluid to increase the pressure in weight-negating relationship to the flow of extrudate.

DESCRIPTION OF THE DRAWING

FIG. 1 is a cross section elevation showing a ram-type extruder in communication with a fluid-tight chamber capable of being pressurized, the communication being effected through an orifice for the flow of extrudate.

PREFERRED EMBODIMENT OF THE INVENTION

In a great many extrusion processes which utilize a downward facing die means, the final shape of the cooled product bears little or no recognizable relationship to the cross section of the orifice in the die means. Examples of such processes are blow-molding and the formation of an envelope of plastic material over a bubble of air. In other processes, the shape of the cooled extrudate is geometrically related to the shape of the orifice but not identical therewith. Examples of such extrusion processes are the formation of plastic pipe wherein tension applied to the cool end of the pipe elongates and narrows down the diameter of the cylindrical extrudate exuding from the orifice to an extent determined by trial and error such that the desired inside diameter and wall thickness of the pipe are maintained. The instant invention is limited to those extrusion processes wherein the extrudate must conform identically to the cross section of the orifice through which it is expressed. More particularly, the process is utilized where the extrudate must be free of contamination and must avoid contact with any solids while it is reactive or hot, and in a deformable state. It finds utility in any process where extrudate must be cooled in a controlled environment and where close tolerances must be maintained on the cross section of the extrudate regardless of shape, and the cross section must correspond substantially identically to that of the die opening. Though the length of the extrudate can be no greater than the length of the fluid-tight chamber, it will be recognized that only practical considerations will dictate the dimensions of the chamber.

Materials which may conveniently be extruded utilizing the instant process include metals, such as titanium, which are sensitive to contamination, thermoplastic polymers such as nylon, which are to be extruded in particular shapes for structural and other mechanical uses, and extrusion of large, single macrocrystals, crystal ingots, or powdered crystals into extrudates of predetermined cross sections, particularly where the extrudate is to be used as a fugitive core in the casting of molten fluids at a temperature below the melting point of the core.

The fluid used to pressurize the fluid-tight chamber may be any fluid which is essentially inert to the extrudate and which will provide sufficient cooling so as to permit the removal of the extrudate in a relatively rigid and non-deformable condition. In most instances, it will be found convenient to use an essentially inert gas as the pressurizing medium. Such gases may be nitrogen, helium, argon, and the like. Liquids which may be used include water, silicones, and mineral oils, the selection of liquid depending both upon the necessary degree of inertness to the extrudate and its desirable heat transfer characteristics.

The instant process will be specifically described in detail with respect to a particular embodiment, wherein a finely divided solid particulate mass of crystals is extruded downwardly under pressure to form an extrudate essentially free of distortion. The crystals are preferably of an ionic salt essentially free from any moisture or water of crystallization, extrudable at a temperature below the melting point of the crystal mass and under sufficient pressure to form a homogeneous, integral polycrystalline mass of arbitrary cross section which is particularly useful as a fugitive core in the casting of molten metals at a temperature below the melting point of the salt extrudate. Particularly useful salts are the alkali metal and alkaline earth metal halides, such as sodium chloride, calcium chloride, and the like.

Referring in detail to the drawing, a particular embodiment of the apparatus useful in the instant invention is a conventional ram-type extruder operated by a mechanical or hydraulic press. Extrusion is carried out in a cylindrical barrel 1, around which is disposed a furnace 2 with means to heat the barrel 1 to any predetermined temperature. Around the furnace 2 is preferably disposed insulating means not shown in the drawing. Within the barrel 1, near the inside wall, is embedded a thermocouple 3 to monitor the temperature, and a removable die means 4 having an orifice 5 within it, said orifice corresponding essentially identically to a cross section of the extrudate to be formed, is fitted in the bottom of the barrel 1. The die means 4 is undercut at 6 and the edges 7 are rounded so as not to tear the surface of the extrudate. A fluid-tight chamber 8 has a flange 9 as an integral part thereof, and the flange 9 rests on a table 10 within which the fluid-tight chamber 8 is removably disposed. The cylindrical barrel 1 rests on the flange 9. A gasket 11, preferably a copper gasket of circular cross section, is disposed upon the flange 9 and under the die means 4 so as to make the chamber 8, under pressure, fluid-tight.

The fluid-tight chamber 8 is sealed at its lower end by a flange 12 having two holes therein, one of which places the interior of the chamber 8 in communication with a source of an inert gas, such as nitrogen, through a pressure-controlling valve 13; the other hole places the interior of the fluid-tight chamber in communication with the pressure gauge 14. In the upper portion of the fluid-tight chamber is a valve outlet 18 for exit of the inert gas, which may be open if cooling by flow of inert gas through the chamber 8 is required.

A mass of thermoplastic particulate solids material 15, such as mass of ionic crystals in the size range from about 325 Tyler mesh to several feet in diameter or a single macrocrystal or crystal ingot is placed with the cylindrical barrel 1 and packed therein so as not to flow out of the orifice 5. After the crystal mass has been heated for a sufficient period of time so as to reach a preselected temperature, below the melting point of the crystal mass, a piston 16 is forced down upon the mass, thereby extruding it through the orifice 5 to form a homogeneous, integral polycrystalline extrudate 17. A cross section of the extrudate in a plane perpendicular to its longitudinal axis reveals that it is substantially identical, dimensionally, to the cross section of the orifice as seen in a top plan view of the die means 4.

With the appropriate designing of the fluid-tight chamber 8, and an appropriately selected rate of extrusion, the mass of gas sealed within the chamber is such that the heating of the gas and the volume reduction of the gas during extrusion generate sufficient pressure, which increases at a rate correlatable to the length of extrudate formed so that essentially no mass flow of inert gas is required. The die means shapes the thermoplastic mass, for example the flowable plastic crystal mass, to conform substantially identically to the configuration of the orifice and the extrudate flowing downwardly through the orifice is cooled in the fluid-tight chamber to form a relatively rigid extrudate. When the desired length has been reached, the extrusion is discontinued by removing the pressure of the piston 16 on the crystal mass 15. After a sufficient amount of time, after which the extrudate is relatively non-reactive in air, the cylindrical barrel and furnace assembly may be raised to clear the sealed chamber 8 and the extrudate removed. Alternatively, the flange at the bottom of the fluid-tight chamber may be removed and the extrudate removed therethrough.

EXAMPLE

A cylindrical section having a diameter of 4.93 inches and a length of 4 inches is cut from a single crystal ingot of sodium-activated cesium iodide. The cylindrical section is placed within the cylindrical barrel 1 of a conventional ram-type extruder, the diameter of the barrel being about 5 inches. The die means 4 has a rectangular orifice 1" x 2" in cross section. The fluid-tight chamber 8 consists of rectangular steel tubing having an inside cross section of 1.25 x 2.25 inches, and is about 4 feet long. A nitrogen tank is placed in valved communication with the chamber 8 and a sensitive pressure gauge reading from 0–15 p.s.i.g. is provided. The ram-type extruder is positioned under a hydraulic press capable of exerting a force of 50 tons.

The table set forth immediately hereinbelow is a record of the formation of an extrudate 1" x 2" in cross section from the cylindrical section. The cross sectional dimensions of the extrudate formed may be maintained, with suitable pressure control, within a tolerance of ±0.005 inch.

TABLE I

| Time, P.M. | Die temperature, °C. | N₂ gauge setting | Remarks |
|---|---|---|---|
| 4:05 | 545 | 2.5 | Pressure control was only approximate. Pressure rose as hot extrudate cooled in chamber. Pressure reading at the time when about 37" of extrudate were formed was 5.5 p.s.i.g. |
| 4:13 | 555 | 2.5 | |
| 4:23 | 565 | 2.5 | |

Extrudates of organic and synthetic thermoplastic extrudable materials are similarly formed, having cross sectional areas essentially identical to the 1" x 2" dimensions of the orifice in the die means. In general, pressurization of the chamber 8 will be relatively low, generally less than 50 p.s.i.g., depending upon the length of the extrudate desired, even when the extrudate is a relatively dense material. Computations of weight-negating pressure (per centimeter length of extrudate) for various ionic crystals are set forth below:

| Material | Density (ρgm./cm.³) | ρg, (dynes/cm.²) | Pressure, p.s.i. |
|---|---|---|---|
| Sodium iodide | 3.67 | 3,590 | 5.20×10⁻² |
| Cesium iodide | 4.51 | 4,420 | 6.41×10⁻² |
| Sodium chloride | 2.165 | 2,120 | 3.07×10⁻² |
| Calcium fluoride | 3.18 | 3,120 | 4.52×10⁻² |
| Potassium iodide | 3.13 | 3,070 | 4.45×10⁻² |
| Lithium iodide | 4.06 | 3,980 | 5.77×10⁻² |

The following Table II sets forth the dimensions of the extrudate from the 1 x 2 orifice as a function of length, the conditions of extrusion being those set forth in Table I hereinbefore:

TABLE II

| Length extended inches | Short side, inches | Long side, inches |
| --- | --- | --- |
| 4 | 1.005 | 2.020 |
| 8 | 1.000 | 2.000 |
| 12 | 1.000 | 2.000 |
| 16 | 1.000 | 2.000 |
| 20 | 0.995 | 1.995 |
| 24 | 0.980 | 1.975 |
| 28 | 0.975 | 1.975 |
| 32 | 0.975 | 1.970 |
| 36 | 0.965 | 1.930 |

I claim:

1. A process for extruding a solid, thermoplastic material in a controlled environment of inert fluid, comprising flowing plastic material through a downwardly facing die means to form, discontinuously, a freely depending extrudate of arbitrary cross section substantially identical to that of the die opening, confining said extrudate in a fluid-tight, pressurizable chamber of predetermined length in which said extrudate displaces said fluid, cooling said extrudate within said chamber without contacting said extrudate with a solid and without sensing any dimension of said extrudate at any time during extrusion, subjecting said extrudate to an upward pressure linearly oppositely directed to the direction of movement of said extrudate, the increase of pressure within said chamber due to the combination of displacement of said fluid and its rise in temperature being sufficient so as essentially to negate the weight of said extrudate, said pressure being a function only of the length of the extrudate and in weight-negating relationship therewith, discontinuing the extrusion when the extrudate has reached a predetermined length, and removing extrudate with a cross section substantially identical to that of the die opening from the chamber when it is relatively rigid and non-deformable.

2. The method of discontinuously forming a polycrystalline extrudate from a solid thermoplastic extrudable material, comprising the steps of:
   (a) discontinuously forcing plastic polycrystalline extrudate downwardly through an orifice in a die means at a temperature below the melting point of said material, said orifice corresponding essentially identically to the cross sectional dimensions of the polycrystalline extrudate to be produced;
   (b) confining said extrudate below said orifice in a fluid-tight, pressurizable cooling zone of predetermined length;
   (c) passing an essentially inert cooling fluid through said zone, at the same time subjecting said extrudate to an upward pressure causing said upward pressure in said zone to rise in weight-negating relationship to said extrudate and linearly, oppositely directed to the direction of movement of said extrudate, said pressure being a function only of the length of said extrudate;
   (d) discontinuing the extrusion when said extrudate has reached a predetermined length without measuring any dimension of said extrudate at any time during extrusion; and
   (e) removing essentially distortion-free, relatively rigid and non-deformable extrudate with a cross section substantially identical to that of the die opening from said zone.

3. The method of claim 2 wherein said solid thermoplastic material is a single macrocrystal, a crystal ingot, or a mass of crystals in excess of about 325 Tyler mesh in size, of an ionic crystal.

4. The method of claim 3 wherein said ionic crystal is selected from the alkaline earth metal halides and alkali metal halides.

References Cited
UNITED STATES PATENTS 3,527,851 9/1970 Bulgin _____ 264—89 X
3,559,271 2/1971 Nilsson _____ 29—420.5

ROBERT F. WHITE, Primary Examiner

T. P. PAVELKO, Assistant Examiner

U.S. Cl. X.R.

72—272; 264—93, 323, 332; 425—376